United States Patent [19]

Coad

[11] 4,416,445
[45] Nov. 22, 1983

[54] VISCOUS SPRING DAMPER
[75] Inventor: L. Dale Coad, Milan, Ohio
[73] Assignee: Imperial Clevite Inc., Rolling Meadows, Ill.
[21] Appl. No.: 214,771
[22] Filed: Dec. 9, 1980

Related U.S. Application Data

[63] Continuation of Ser. No. 950,949, Oct. 13, 1978, abandoned.

[51] Int. Cl.³ ............................................. F16F 9/08
[52] U.S. Cl. .................................... 267/35; 267/8 R; 267/140.1; 248/562
[58] Field of Search ................. 267/3, 8 R, 35, 63 A, 267/64.23, 64.27, 118, 121, 152, 153, 140, 140.1, 141, 141.2, 141.6, 141.7, 64.15; 188/298; 137/513.3, 854; 248/562; 92/34, 42, 44, 48

[56] References Cited

U.S. PATENT DOCUMENTS

| | | | |
|---|---|---|---|
| 2,545,857 | 3/1951 | Perkins et al. | 31/86 |
| 2,818,249 | 12/1957 | Boschi | 267/33 |
| 2,982,538 | 5/1961 | de Carbon | 267/64.15 |
| 2,984,476 | 5/1961 | Turner | 267/35 |
| 3,509,795 | 5/1970 | Woodward | 92/92 |
| 3,658,314 | 4/1972 | Luzsicza | 267/121 |
| 3,701,322 | 10/1972 | Carle | 105/197 |
| 3,717,105 | 2/1973 | Novotny | 105/197 |
| 3,941,149 | 3/1976 | Mittleman | 137/493.1 |
| 4,054,152 | 10/1977 | Ito et al. | 137/512 |
| 4,126,084 | 11/1978 | Inada et al. | 91/443 |
| 4,352,487 | 10/1982 | Shtarkman | 267/8 R |

FOREIGN PATENT DOCUMENTS 2253269 10/1972 Fed. Rep. of Germany .
2524021 4/1977 Fed. Rep. of Germany ... 267/64.23
1152494 2/1958 France .
942729 11/1963 United Kingdom .

Primary Examiner—Douglas C. Butler
Assistant Examiner—R. R. Diefendorf
Attorney, Agent, or Firm—Russell E. Baumann

[57] ABSTRACT

A viscous spring damper including inner and outer members connected by an elastomeric shear spring and having a main fluid chamber defined therebetween for communication with a second fluid chamber in the inner member through a restricted orifice. The members are relatively movable for stressing the shear spring and varying the volumes of the chambers while fluid is transferred therebetween through the restricted orifice. An elastomeric bladder within the second fluid chamber is selectively chargeable with gas pressure for calibrating the damping characteristics, varying the initial spring rate or leveling a vehicle on which the damper is installed. Axially-spaced circumferential wear rings on the bladder minimize bladder abrasion against the inner wall of the inner member. An elastomeric ring attached to the inner member within the main fluid chamber engages the outer member when the damper bottoms out and this seals the restricted orifice against flow of fluid therethrough from the main fluid chamber to the second fluid chamber. The restricted orifice includes an elastomeric restrictor having a yieldable flap covering a passage for blocking flow therethrough in one direction while providing flow in a reverse direction. A load transfer member attached to the inner member opposite from the outer member by another elastomeric shear spring provides two different stages for the damper.

12 Claims, 12 Drawing Figures

VISCOUS SPRING DAMPER

This is a continuation of application Ser. No. 950,949 filed Oct. 13, 1978 now abandoned.

BACKGROUND OF THE INVENTION

The present invention relates generally to shock absorbers. More particularly, it relates to shock absorbers of the type which use both an elastomeric shear spring and flow of fluid through a restricted orifice for absorbing shock and dissipating energy.

Known shock absorbers of the type described include those disclosed in U.S. Pat. No. 2,818,249 issued Dec. 31, 1957 to Boschi, U.S. Pat. No. 3,658,314 issued Apr. 25, 1972, to Luzsicza, and, British Pat. No. 1,148,515 issued Apr. 16, 1969 to Moulton. In the British patent, a force transmitting member deforms a diaphragm for transmitting force through a fluid to an elastomeric shear spring. The fluid flows through an orifice covered by yieldable flaps which provide one-way flow. The Luzsicza device has a piston separating a gas pressure chamber from a fluid chamber and a bumper is mounted on the bottom of the outer member for limiting telescoping movement of the inner and outer members. It is necessary to machine the cylinder for the piston in order to provide good sealing and smooth piston movement. Maintaining effective seals on the piston over long periods of time is very difficult. The Boschi device includes a bladder in an inner chamber but there is no way to selectively charge the bladder with variable gas pressure. The bladder would also wear rapidly if the cylinder in which it moves is not smooth.

SUMMARY OF THE INVENTION

The present invention concerns the provision of an expandable and contractible elastomeric bladder for separating a gas chamber from a fluid chamber in a viscous spring damper, and for varying the spring rate of the damper, calibrating the damper or leveling a load supported thereby.

In another aspect, the invention concerns the provision of a viscous spring damper with first and second outer members connected with opposite end portions of an inner member by first and second elastomeric shear springs having different deformation characteristics.

In still another aspect, the present invention concerns the location of a bumper ring on an end wall of the inner member for sealing against the inner surface of an outer member to block further flow of fluid through an orifice from a main fluid chamber to a second fluid chamber.

A further aspect of the invention concerns the provision of a simplified and efficient elastomeric restrictor for providing non-linear flow through the orifice between the main fluid chamber and the second fluid chamber.

It is a principal object of the present invention to provide an improved viscous spring damper having improved operating characteristics.

It is another object of the invention to provide an improved viscous spring damper having an improved bladder construction for separating a gas chamber from a fluid chamber.

It is another object of the invention to provide an improved viscous spring damper having a plurality of different stages with different damping characteristics.

It is also an object of the invention to provide a viscous spring damper with an improved stop bumper.

It is an additional object of the invention to provide an improved restrictor valve for providing fluid flow between variable volume fluid chambers in a viscous spring damper.

DESCRIPTION OF THE PREFERRED EMBODIMENTS OF THE INVENTION

Figure 1:
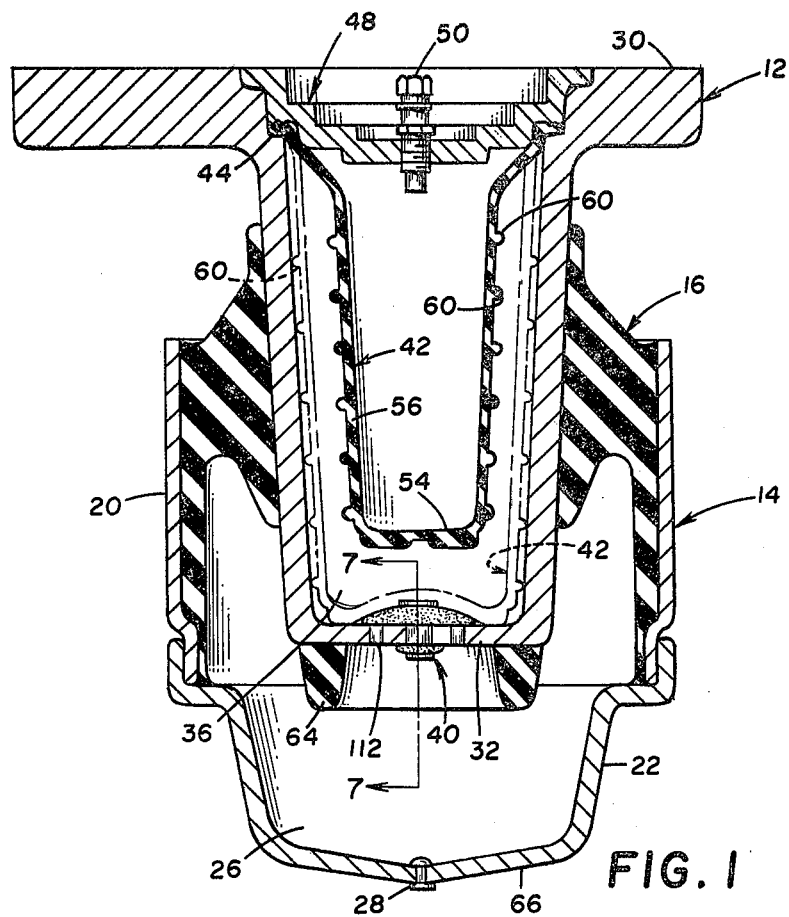
FIG. 1 is a cross-sectional elevational view of a viscous spring damper constructed in accordance with the present invention.

FIG. 1 shows a viscous spring damper including an inner member 12 connected with an outer member 14 by an elastomeric shear spring 16 which is bonded to the surfaces of the inner and outer members. Outer member 14 includes an outer tube 20 secured to a cap 22. A main fluid chamber 26 is defined between inner and outer members 12 and 14, and elastomeric shear spring 16. A plug 28 is positioned in an opening in cap 22 after a desirable quantity of fluid is introduced into main fluid chamber 26. References to a fluid in this application are meant to define a liquid, such as hydraulic fluid.

Inner member 12 includes an outwardly extending mounting flange 30 and an elongated cup-like portion including an end wall 32 having a peripheral wall 34 extending therefrom to enclose an elongated second fluid chamber 36. Orifice means generally indicated at 40 is provided for transferring fluid between fluid chambers 26 and 36.

An elongated expandable and contractible elastomeric bladder 42 is positioned within second fluid chamber 36, and has a circumferential mounting flange 44 secured between a circumferential shoulder on an inner member 12 and a cap member 48 which is press fit or otherwise suitably secured to inner member 12. Cap member 48 has valve means in the form of an air check valve 50 mounted thereon for selectively charging bladder 42 with variable gas pressure. Bladder 42 is shaped to generally conform with the shape of second fluid chamber 36, and includes a bladder end wall 54 facing end wall 32, and a bladder peripheral wall 56 facing inner member peripheral wall 34.

Bladder 42 has a plurality of spaced wear means thereon for minimizing abrasion of the bladder. This makes it possible to omit machining of the interior of second fluid chamber 36. The wear means may take many different forms and, in one arrangement, comprises a plurality of axially-spaced outwardly projecting circumferential rings 60 integral with bladder peripheral wall 56. Bladder end wall 54 may also be substantially thicker than the remainder of the bladder to provide abrasion resistance. When bladder 42 expands and contracts, it rubs against the interior of inner member end wall 32 and peripheral wall 34, and wear means 60 minimizes any danger of rupturing the bladder. Rings 60 are sufficiently close together, and the bladder wall therebetween is sufficiently thick, to prevent the bladder from bulging outwardly between adjacent rings into contact with the surface of inner member peripheral wall 34. Circumferential rings 60 also trap hydraulic fluid therebetween for maintaining lubricant along the peripheral wall of bladder 42 to further minimize abrasion thereof.

Bumper stop means in the form of an elastomeric ring 64 is attached to inner member end wall 32 within main fluid chamber 26. Ring 64 may be attached to end wall 32 in any suitable manner, including mold bonding, mechanical fasteners or a chemical adhesion.

The viscous spring damper may be used as a shock absorber on vehicles, or on machinery supports or the like. When used on vehicles, inner member 12 is connected with the vehicle body, while outer member 14 is connected to the vehicle axle. Relative telescoping axial movement between inner and outer members 12,14 stresses elastomeric shear spring 16, and varies the volumes of fluid chambers 26,36 while fluid is transferred therebetween through orifice means 40. This action absorbs shock and dissipates energy in a known manner.

Figure 2:
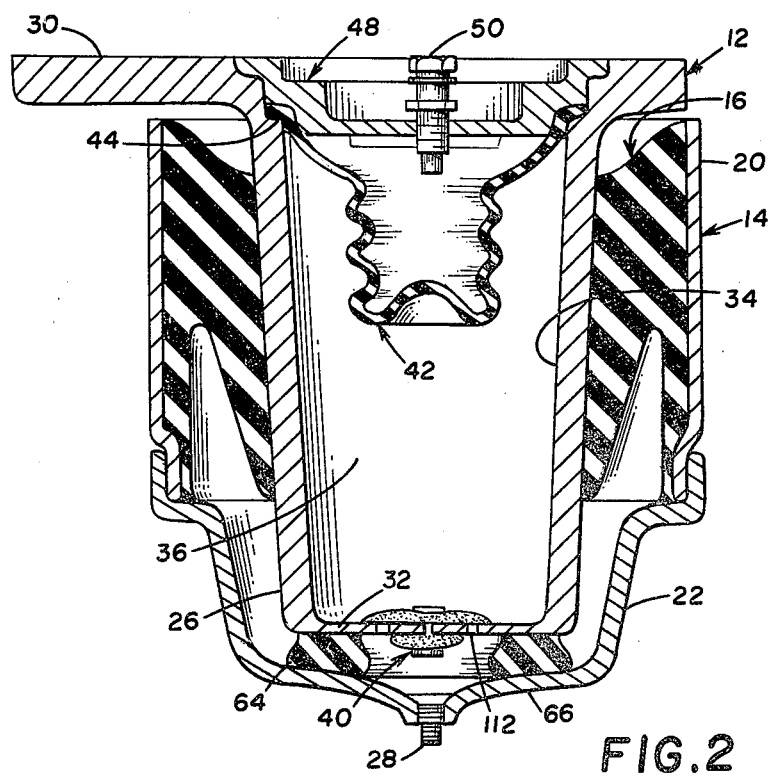
FIG. 2 is a cross-sectional elevational view of the damper of FIG. 1 in a telescoped condition.

Outer member 14 has an end wall 66 opposite inner member end wall 32. When the inner and outer members are substantially fully telescoped, bumper stop ring 64 engages the inner surface of outer member end wall 66 as shown in FIG. 2. With ring 64 surrounding orifice means 40 in radially outwardly spaced relationship thereto, engagement of ring 64 with the inner surface of outer member 14 seals main fluid chamber 26 against further flow of fluid through orifice means 40 into second fluid chamber 36. This provides a hydraulic lock, and a significant amount of the load is supported on the hydraulic fluid trapped within main fluid chamber 26. This results in a very high final spring rate.

The initial spring rate of the viscous spring damper may be varied by varying the gas pressure within the bladder 42. The damping characteristics of the damper may also be calibrated by varying the gas pressure within bladder 42. In addition, a vehicle having the damper innstalled thereon may be leveled under varying loads by varying the gas pressure within bladder 42.

Figure 3:
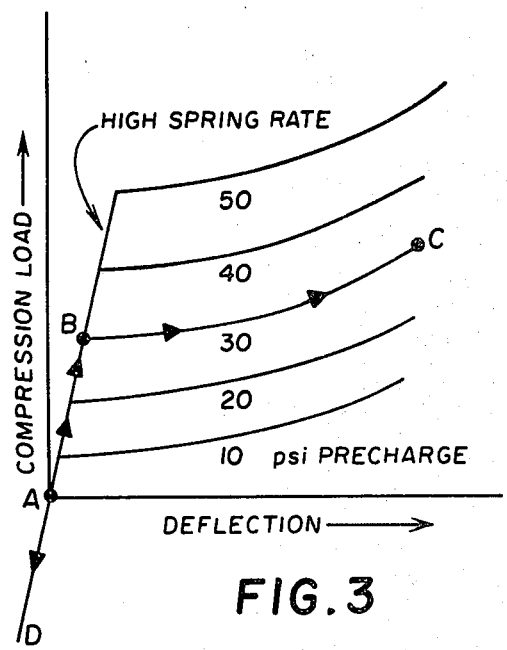
FIG. 3 is a graph showing how it is possible to vary the initial spring rate of the damper of FIG. 1.

FIG. 3 shows a graph with telescoping deflection between inner and outer members 12,14 plotted on the abscissa, and deflecting compressive load plotted on the ordinate. The initial spring rate of the device is represented by the steep straight line extending along A-B. This initial spring rate may be varied by varying the gas pressure within bladder 42. For example, the dotted line showing of FIG. 1 shows bladder 42 in a fully expanded condition so it is pressurized to a pressure greater than the pressure within main fluid chamber 26. As the damper is loaded, it is initially very stiff because fluid cannot be transferred from main fluid chamber 26 to second fluid chamber 36 through orifice means 40. When the load reaches point B, the bladder begins to contract as fluid is transferred to chamber 36 from chamber 26 and the damper will deflect along the curve B-C. The point at which the damper deflects along a smoother low slope curve B-C may be varied by varying the precharge gas pressure within bladder 42. Loading of the damper in extension by loads tending to axially separate members 12,14 is represented by lines A-D. A hydraulic lock is formed and provides a high spring rate in extension limited only by the elastic quality of the elastomeric shear spring and by the vapor pressure of the fluid. This is a desirable characteristic for good cornering stability.

If the precharge gas pressure within bladder 42 is made substantially equal to the pressure in main fluid chamber 26, a much lower initial spring rate will result. In the manufacture of dampers of the type described, the deflection characteristics of elastomeric shear spring 16 will vary due to differences in the rubber or other material used. Therefore, it is possible to calibrate each damper by varying the gas pressure within bladder 42 to correspond with the deflection characteristics of the elastomeric shear spring in each particular damper. With bladder 42 fully expanded as shown in shadow lines in FIG. 1, bladder end wall 54 seals orifice means 40 to prevent flow of fluid therethrough until pressure acting on bladder 42 is sufficient to slightly compress same.

Figure 4:
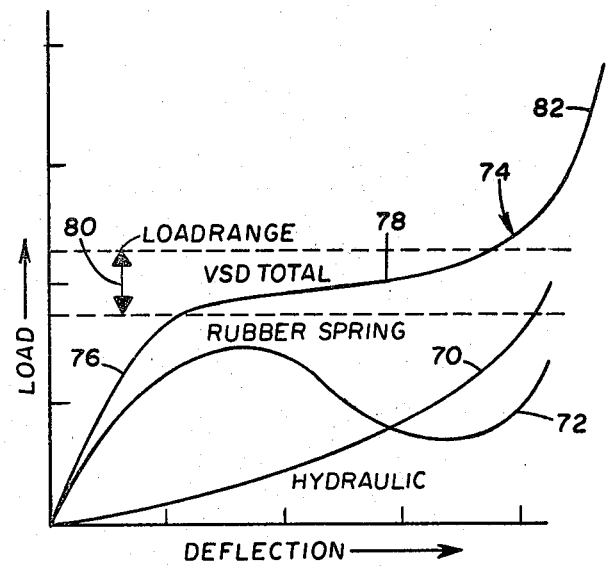
FIG. 4 is a graph showing the deflection characteristics of the damper of FIG. 1.

FIG. 4 is a graph showing the general deflection characteristics of the elastomeric shear spring, the hydraulic damper, and the combined deflection characteristics. Deflection is plotted on the abscissa, while load is plotted on the ordinate. Curve 70 shows that the hydraulic damper has a very low initial spring rate. Curve 72 shows that the elastomeric shear spring has a relatively high initial spring rate but then deflects very rapidly after an initial stiffness is overcome. The combined deflection curve indicated at 74 shows that it is possible to achieve a relatively high initial spring rate at 76 which merges into a relatively soft characteristic 78 in load range 80, and then a final high spring rate 82 achieved by pressurizing the bladder and sealing the orifice means against flow therethrough as described with reference to FIG. 2. Varying the initial gas pressure within bladder 42 makes it possible to vary portion 76 of curve 74. When a vehicle is loaded, it is also possible to vary the gas pressure within bladder 42 in order to change the load range 80.

Figure 5:
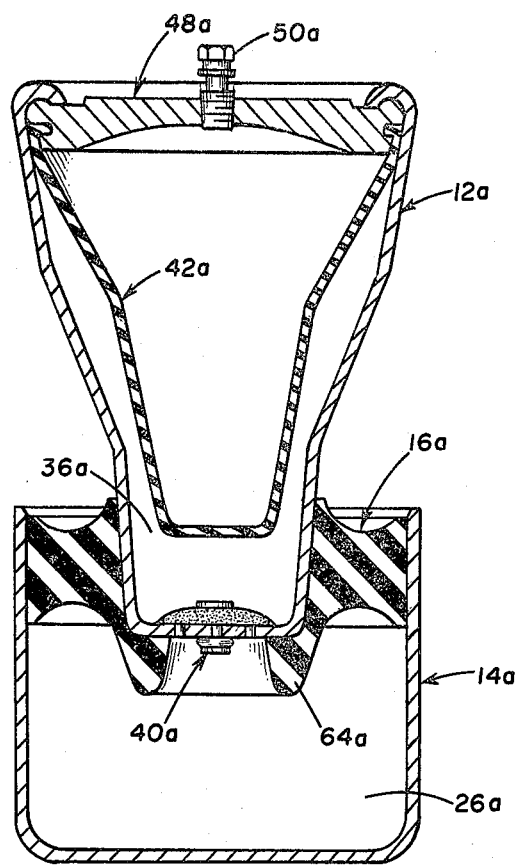
FIG. 5 is a cross-sectional elevational view of another embodiment.

FIG. 5 shows another embodiment wherein inner and outer members 12a, 14a are connected by an elastomeric shear spring 16a having bumper stop ring 64a formed integrally therewith. This eliminates an extra part along with the need to assemble same. In other respects, the viscous spring damper of FIG. 5 operates in the same manner as explained with reference to FIG. 1. The other features and characteristics of the damper described in FIG. 1 may also be included in the damper of FIG. 5. Main fluid chamber 26a communicates with second fluid chamber 36a through orifice means 40a. Bladder 42a is secured within inner member 12a by a cap member 48a having gas valve 50a secured thereto.

Figure 6:
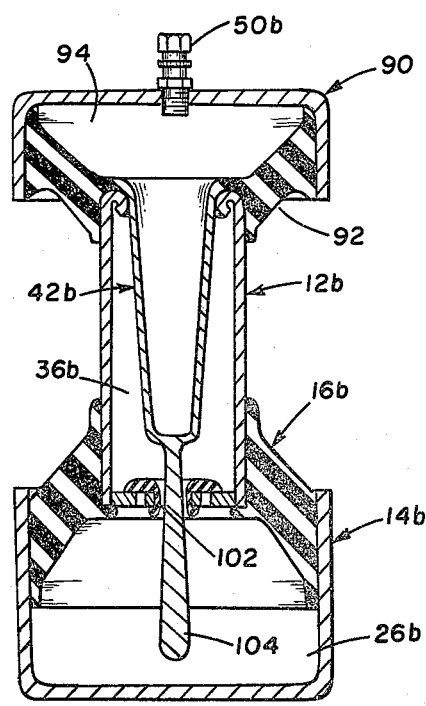
FIG. 6 is a cross-sectional elevational view of still another embodiment.

FIG. 6 shows another arrangement wherein inner member 12b has first and second outer members 90,14b connected thereto by first and second elastomeric shear springs 92,16b. First outer member 90 also defines the load transfer member for transferring the load to the damper. In this embodiment first elastomeric shear spring 92 has less stiffness than second shear spring 16b, although other shear spring combinations can be used. Bladder 42b is shown as being formed integral with first shear spring 92. However, it will be recognized that bladder 42b can be formed separately from first shear spring 92 and secured to the open end of inner member 12b by a cap member having a large central opening for providing free communication therethrough with the interior of the bladder. Gas valve 50b extends through first outer member 90 for communication with a gas chamber 94 which also communicates freely with the interior of bladder 42b. As the damper is loaded, first outer member 90 deflects downwardly in FIG. 6 while first elastomeric shear spring 92 deforms. This action also increases the gas pressure within gas chamber 94 and bladder 42b. When first outer member 90 substantially bottoms out, the load is transferred through inner member 12b to second elastomeric shear spring 16b which then operates in the same manner as described with reference to FIG. 1.

In the arrangement of FIG. 6, the orifice means is shown as including a large central opening 102, and bladder 42b has an integral elongated restrictor projection 104 extending through the opening. Restrictor projection 104 varies in size along its length to vary the size of opening 102 in accordance with the expanded and contracted condition of bladder 42b. In the arrangement shown, restrictor projection 104 is shown as increasing in size from bladder 42b to the free end of projection 104. Thus, as the damper is loaded and deflects, with resulting collapse of bladder 42b, the size of opening 102 decreases so that a higher spring rate will progressively result as deflection proceeds. Obviously, the size of projection 104 may be reversely varied if so desired. It will also be recognized that instead of having projection 104, the bladder of FIG. 6 can be the same as the bladder in FIG. 1. Fluid is transferred between main and second fluid chambers 26b,36b as the volume thereof varies during deflection of the damper. It is also possible to provide the damper of FIG. 6 without using a bladder. Instead of using a conventional hydraulic fluid, a gel-like liquid which does not trap or form the gas could be substituted.

Figure 7:
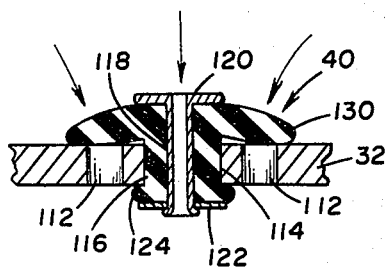
FIG. 7 is a cross-sectional elevational view of a restrictor valve taken generally on line 7—7 of FIG. 1.
Figure 8:
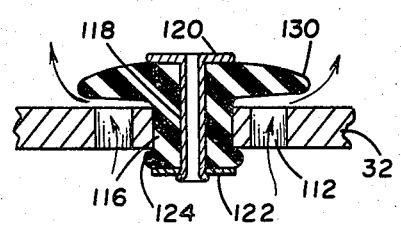
FIG. 8 is a cross-sectional elevational view similar to FIG. 7 and showing slow flow through the restrictor valve.
Figure 9:
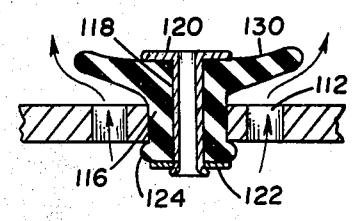
FIG. 9 is a view similar to FIG. 8 and showing fast flow through the restrictor valve.

FIGS. 7-9 show a valving arrangement for the orifice connecting the two fluid chambers. A plurality of first flow passages are defined by a plurality of circumferentially-spaced holes 112 arranged in a circular pattern through end wall 32 outwardly of a central restrictor mounting hole 114. An elastomeric restrictor includes a central stem 116 tightly received through mounting hole 114. A hollow rivet including a hollow stem 118 and a flange 120 at one end extends centrally through restrictor stem 116 and has a retaining washer 122 secured to its other end. Washer 122 is secured to rivet stem 118 with restrictor stem 118 under compression to provide an enlargement 124. The other end of restrictor stem 116 has an enlargement in the form of a yieldable circular flap 130 covering holes 112 and being yieldable away from end wall 32 to provide non-linear flow from the main fluid chamber to the second fluid chamber as shown in FIGS. 8 and 9. FIG. 8 shows elastomeric flap 130 deflected upwardly to provide slow upward flow, while FIG. 9 shows flap 130 deflected further upwardly to provide fast flow. Return flow takes place through the return passage defined by hollow rivet stem 118. This provides linear flow from the second fluid chamber back to the main fluid chamber. Instead of using a hollow rivet for securing the elastomeric restrictor in place, it will be recognized that it is possible to provide an integral central return hole through the elastomeric restrictor and to provide an enlarged snap head on the stem for snapping through mounting hole 114.

Figure 10:
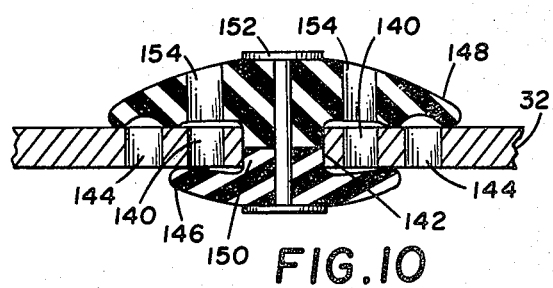
FIG. 10 is a cross-sectional elevational view of another embodiment of a restrictor valve.
Figure 11:
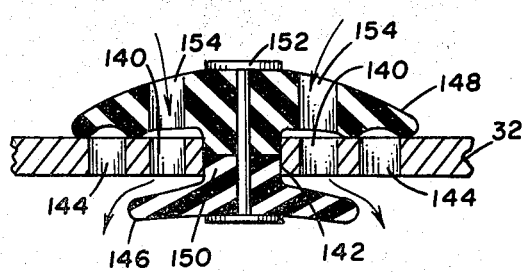
FIG. 11 is a cross-sectional elevational view similar to FIG. 10 and showing flow in one direction through the restrictor valve; and, FIG. 12 is a cross-sectional elevational view similar to FIG. 10 and showing flow through the restrictor valve in an opposite direction.
Figure 12:
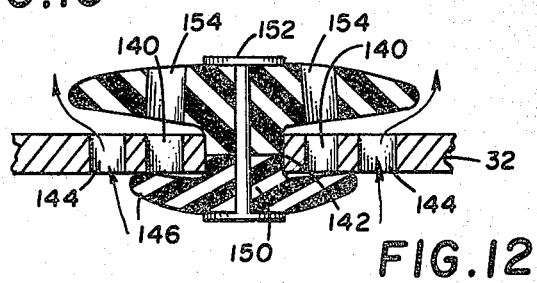

FIGS. 10-12 show another arrangement wherein a plurality of first flow holes 140 are arranged in a circular pattern outwardly of restrictor mounting hole 142. A plurality of second flow holes 144 are arranged in a circular pattern outwardly of first flow holes 140. An elastomeric restrictor has a small circular yieldable flap 146 covering first flow holes 140 and a large circular yieldable flap 148 covering second flow holes 144. The restrictor is made in two pieces, with each piece having a flap 146,148 thereon and a portion of a stem received in mounting hole 142 to define a restrictor mounting stem 150. A rivet 152 which may or may not be hollow is provided for securing the elastomeric restrictor in place. Large flap 148 has a plurality of holes 154 therethrough aligned with first flow holes 140 to provide flow through large flap 148 to first flow hole 140. Large flap 148 blocks flow in one direction through second flow holes 144 while allowing flow therethrough in a reverse direction as shown in FIG. 12. Small flap 146 blocks flow through first flow holes 140 in the reverse direction while providing flow therethrough in the one direction as shown in FIG. 11. Flow through first flow holes 140 in the one direction takes place by having the fluid flow through holes 154 in large flap 148.

Although additional flow openings and a flap valve are shown in FIG. 6, it will be recognized that it is possible to omit such openings and the flap valve and to use only the projection 104 and hole 102. For features of the invention useable independently of the specific stop bumper, such bumper can be located between a vehicle body and axle or in other locations.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A viscous spring damper having non-linear damping characteristics including a relatively soft damping characteristic over a selectable load range and a relatively high spring rate below the selectable load range, the damper comprising:

an outer member and an inner member connected by an elastomeric shear spring and defining a main fluid chamber therebetween which contains a fluid and has a main chamber volume, the outer and inner members being movable relative to each other such that the shear spring is stressed and the main chamber volume is varied;

a restricted orifice means for providing fluid communication between the main chamber and a second chamber defined by the inner member;

an expandable and contractible bladder which is selectively charged with gas to a selectable gas pressure independent of the fluid pressure by charging means for selectively varying the bladder's expandability and contractibility and causing it to be in contact with said inner member and said restricted orifice means in an unstressed condition, the bladder being disposed in said second chamber such that the bladder gas pressure controls the fluid pressure at which fluid flows from the main chamber through the orifice means into the second chamber, whereby under loads which cause a fluid pressure which is too small to compress the bladder, the damper has a relatively high spring rate which is affected by the resiliency of the elastomeric shear spring and the compressibility of the fluid and whereby under loads which are sufficiently great to compress the bladder and cause fluid to flow from the main chamber into the second chamber, the damper has a relatively soft damping characteristic which is affected by the compressibility of the bladder and flow rates through the orifice means.

2. The viscous spring damper as set forth in claim 1 further including a valve means for selectively charging the bladder with the selected gas pressure such that the load range is selected.

3. The viscous spring damper as set forth in claim 2 further including a bumper stop means for preventing the flow of fluid from the main chamber to the second chamber in response to a preselected decrease in the main chamber volume such that when the bladder is contracted sufficiently to cause the preselected main chamber volume decrease, fluid flow through the orifice means is prevented, whereby above the selectable load range the viscous spring damper has a relatively high spring rate which is affected by the characteristics of the elastomeric shear spring and the compressibility of the fluid.

4. The viscous spring damper as set forth in claim 2 wherein said bladder is expandable under the charged gas pressure into contact with said orifice means for controlling the fluid flow therethrough.

5. The viscous spring damper as set forth in claim 2 wherein said bladder is engagable with said inner member and includes a plurality of spaced, integral peripheral wear means extending outward from the bladder for protecting the bladder against abrasion from the inner member.

6. The viscous spring damper as set forth in claim 2 wherein said inner member has an end wall through which said orifice means extends and an elongated peripheral wall extending from the end wall in a direction away from said main chamber, said second chamber being defined within said end and peripheral wall, and said bladder having a bladder end wall facing said inner member end wall and a bladder peripheral wall facing said inner member peripheral wall such that said bladder conforms generally with the shape of said second chamber.

7. The viscous spring damper as set forth in claim 6 wherein said bladder includes a plurality of axially-spaced circumferential rings projecting outward from said bladder peripheral wall whereby the circumferential rings assist in maintaining the bladder peripheral wall lubricated with the fluid and in protecting the bladder from abrasion by the inner member peripheral wall.

8. The viscous spring damper as set forth in claim 2 further including a bumper stop means disposed on an end wall of one of said inner and outer members and in a spaced relationship with the end wall of the other of said inner and outer members such that the bumper stop means limits telescoping movement of the inner and outer members.

9. The viscous spring damper as set forth in claim 8 wherein said bumper stop means includes a bumper annular ring surrounding the orifice means such that upon engaging the inner and outer member end walls, fluid flow between the main chamber and the second chamber through the orifice means is prevented whereby above the selected load range the damper has a relatively high spring rate which is affected by elastomeric properties of the bumper annular ring and compressibility of the fluid.

10. The viscous spring damper as set forth in claim 1 wherein said restricted orifice means includes at least a first passage in said inner member for providing fluid communication between the main and second chambers and an elastomeric, yieldable flap covering said first passage such that said flap causes fluid flow through this first passage to be unidirectional and further including at least one additional passage for providing fluid flow between the main and second chambers at least in a direction opposite the unidirectional flow.

11. The viscous spring damper as set forth in claim 10 wherein said yieldable flap is disposed in said second chamber such that it limits flow through the first passage from the main chamber to the second chamber whereby the additional passage provides flow from the second chamber to the main chamber.

12. The viscous spring damper as set forth in claim 1 wherein said orifice means includes passages in said inner member for establishing communication between the main and second chambers and an elastomeric restrictor attached to said inner member and having a yieldable flap covering said passages, which flap is yieldably displaceable away from the inner member for providing flow through the passages in one direction, and an additional passage through the elastomeric restrictor which provides fluid flow between the main and second members.

* * * * *